Figure 1:
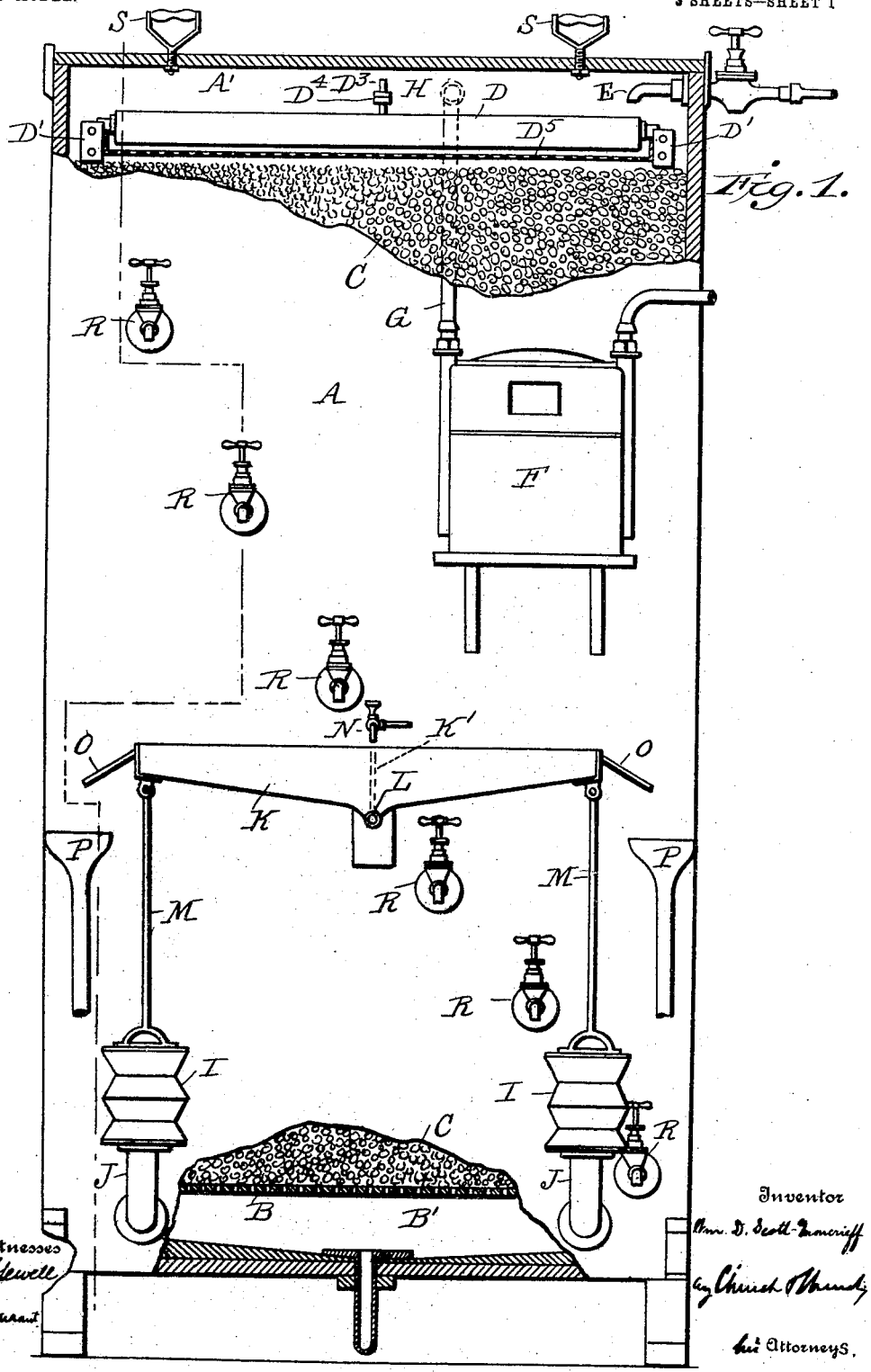

No. 765,794. PATENTED JULY 26, 1904.
W. D. SCOTT-MONCRIEFF.
APPARATUS FOR TESTING ORGANICALLY CONTAMINATED LIQUIDS.
APPLICATION FILED APR. 27, 1904.
NO MODEL. 3 SHEETS—SHEET 1.

No. 765,794. PATENTED JULY 26, 1904.
W. D. SCOTT-MONCRIEFF.
APPARATUS FOR TESTING ORGANICALLY CONTAMINATED LIQUIDS.
APPLICATION FILED APR. 27, 1904.
NO MODEL. 3 SHEETS—SHEET 2.
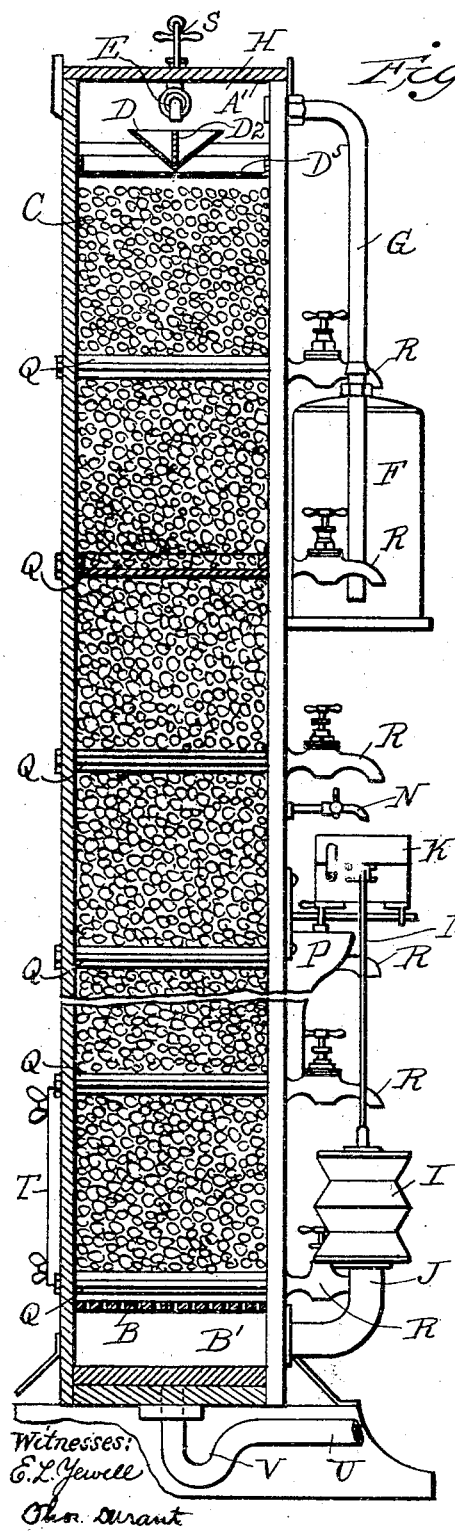
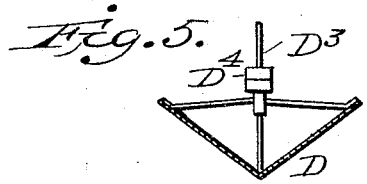
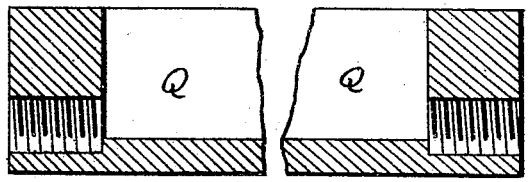
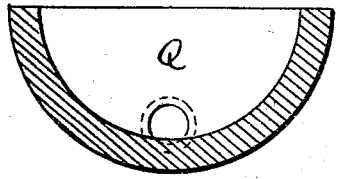

No. 765,794. PATENTED JULY 26, 1904.
W. D. SCOTT-MONCRIEFF.
APPARATUS FOR TESTING ORGANICALLY CONTAMINATED LIQUIDS.
APPLICATION FILED APR. 27, 1904.
NO MODEL. 3 SHEETS—SHEET 3.
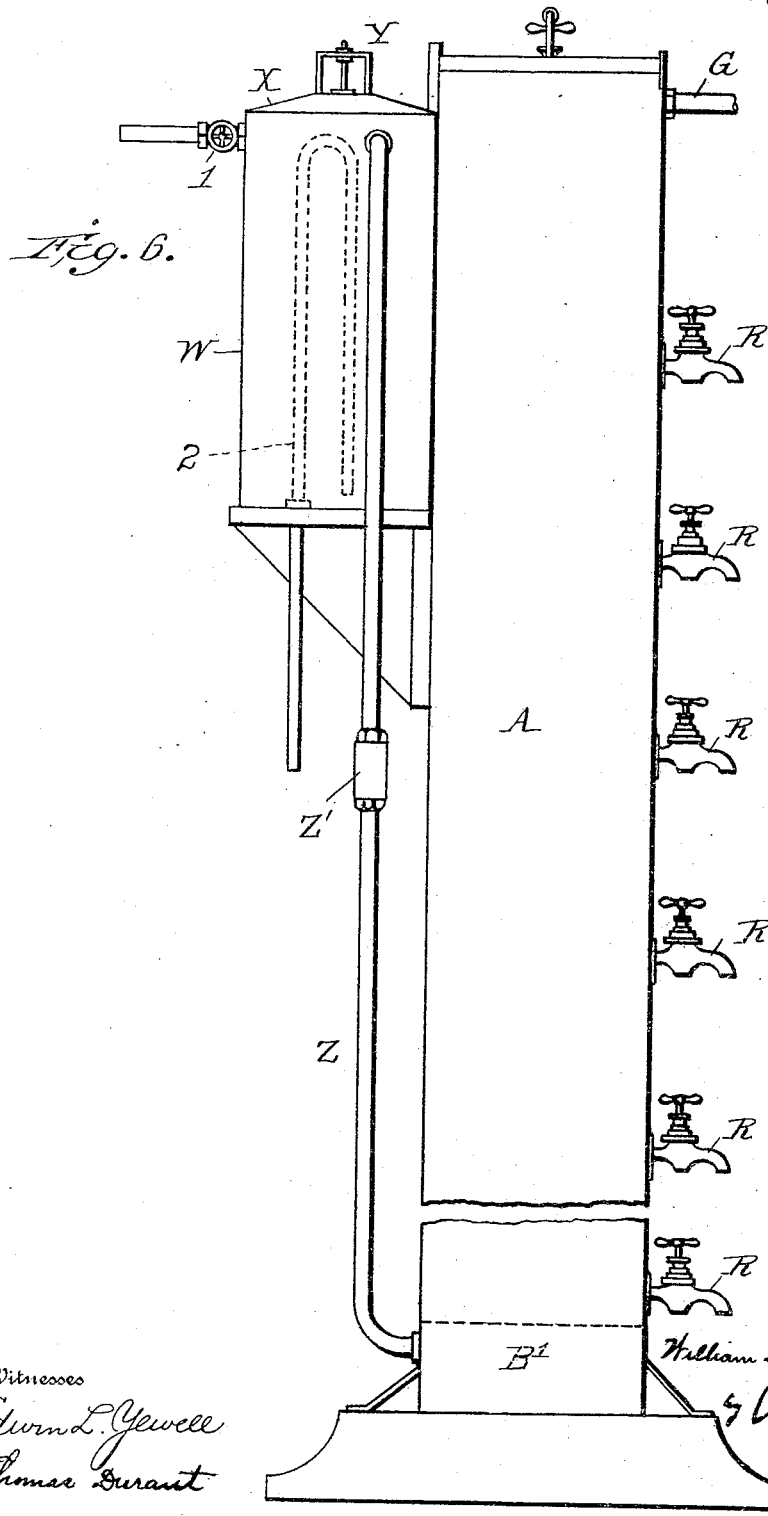

No. 765,794. Patented July 26, 1904.

UNITED STATES PATENT OFFICE.

WILLIAM DUNDAS SCOTT-MONCRIEFF, OF WESTMINSTER, ENGLAND.

APPARATUS FOR TESTING ORGANICALLY-CONTAMINATED LIQUIDS.

SPECIFICATION forming part of Letters Patent No. 765,794, dated July 26, 1904.

Application filed April 27, 1904. Serial No. 205,233. (No model.)

*To all whom it may concern:*

Be it known that I, WILLIAM DUNDAS SCOTT-MONCRIEFF, of the city of Westminster, England, have invented certain new and useful Improvements in Apparatus for Testing Organically-Contaminated Liquids; and I do hereby declare the following to be a full, clear, and exact description of the same, reference being had to the accompanying drawings, forming a part of this specification, and to the figures and letters of reference marked thereon.

In bacteriological purification of liquids—such, for example, as sewage and sewage effluents contaminated with organic matter—the liquid (hereinafter referred to as "sewage") is subjected to the action of anaerobic bacteria and afterward to that of aerobic bacteria.

Hitherto it has been impossible to obtain sufficiently reliable data on which to base the design of sewage-nitrifying plant, so as to insure that such plant when erected and in use would give even an approximation to the best results obtainable from the bacteria.

Now this invention has for its object to provide means or apparatus for testing sewage whereby different kinds of sewage can be compared in terms of their susceptibility to the chemical changes produced by bacterial action in a filter of standard material and grading so long as facilities are provided for estimating the effect produced per unit of filtering depth in sequence with accurate measurements of the amount of air necessary in a given case to give any required ratio of oxidized to unoxidized nitrogen or other standard of purification in the final effluent.

The preferred embodiment of the invention comprises an air-tight box or vessel constructed of any suitable material and size and provided internally at a short distance above its bottom with a perforated plate or grating on which is placed the filtering material. Above the said filtering material there is provided suitable distributing apparatus for the sewage, which is supplied thereto by a pipe provided with means, such as a tap or valve, for controlling the supply of the sewage to be tested. Communicating with the space between the perforated plate or grating and the bottom of the box or vessel through suitable ducts or pipes is an air-extracting apparatus—such, for example, as bellows—worked by any convenient kind of motive power and operated so as to draw measured quantities of air downward through the filtering material and to discharge the same into the outer air.

At any desired interval in the height of the apparatus collecting-channels with taps or valves are provided for the purpose of taking samples of the sewage at different depths and ascertaining the progress of the purification.

By means of apparatus such as described different kinds of sewage can be standardized in terms of the measured factors required to purify the same, which for the more ready understanding of my invention may be classified as follows: A, rate of discharge of the sewage, (in, say, pints per square foot per hour;) B, period of rest, (say in minutes between each discharge;) C, quantity of air (say in cubic feet per hour) required to effect the desired degree of purification; D, depth (say in feet) of filtering material.

Referring to the accompanying drawings, Figure 1 illustrates, partly in front elevation and partly in section, and Fig. 2 partly in cross-section and partly in side elevation, one embodiment of apparatus constructed according to this invention. Figs. 3 and 4 show, respectively, in longitudinal section and cross-section and to a larger scale than Figs. 1 and 2 one of the collecting-channels. Fig. 5 is a detail view. Fig. 6 is a view in elevation of a modified form of apparatus.

In this apparatus A is the air-tight vessel, provided internally near its bottom with a perforated plate B, on which rests the standard filtering material C, the interior of the vessel being made of a predetermined area in horizontal section—say, for example, three and a half square feet—and provided with a predetermined depth—say six feet—of filtering material.

D is a tilting trough supported in bearings $D'$ in the upper part of the vessel A and divided longitudinally by a central partition $D^2$ into two compartments, that are alternately filled with sewage supplied by a regulating-tap E. This trough is provided with means—such as a vertical stem $D^3$, Fig. 5—upon which can be slipped one or other of a series of different weights $D^4$, so that by varying the weight the trough can be caused to oscillate at any desired period, thus dividing the total quantity of sewage delivered per hour into any required number of discharges.

$D^5$ is a stationary tray having a perforated bottom arranged below the tilting trough D, so as to distribute the sewage evenly over the upper surface of the filtering material. By this arrangement the two compartments of the trough will be filled alternately and the trough caused to turn on its bearings, so as to discharge measured quantities of sewage alternately in opposite directions and at predetermined intervals over the surface of the filtering material C through the perforated tray $D^5$.

F is an ordinary gas-meter through which air is aspirated and delivered by a pipe G to the space H above the filtering material.

I I are bellows that communicate by pipes J J with the space B' between the perforated plate B and the bottom of the vessel A and serve the double purpose of extracting the spent air from the vessel A, together with noxious gases that are unfavorable to the life processes of the organisms present, and drawing in measured quantities of fresh air through the meter F. The bellows may be operated by any suitable or preferred means, that illustrated consisting of a tilting trough K, pivoted at L and divided into two compartments by a vertical partition K'. The trough is connected by rods M M with the bellows I I and is actuated by water supplied by a tap N alternately to each of its compartments, the small pipes O O at the ends of the compartments serving when the trough K tilts alternately in opposite directions to conduct the waste water to funnels P P, located on the outside of the vessel A. Within the air-tight vessel A are transverse collecting channels or troughs Q Q, arranged at any desired distances apart, each channel Q being provided with a cock R, through which samples of the sewage can be drained off for examination. The successive transverse channels or troughs Q Q are not arranged directly over each other, but are displaced sidewise relatively to each other, so as to better collect samples of the sewage from the different parts of the filter. The channels also serve as stays for the sides of the vessel A. The top part of the vessel A is made in the form of a lid A', that can, by means of handles S, be readily removed and replaced.

The lower part of the apparatus is provided with a door T, secured in position by bolts or the like, for convenience in emptying or clearing out the filter and changing the filtering material when desirable. The final effluent passes away by a pipe U, formed with a trap V.

An example will make clear the method of using the apparatus. Assuming that it is desired to ascertain the data requisite to bring about in a given sample of sewage a ratio of oxidized to unoxidized nitrogen in the final effluent of ninety-eight per cent, the apparatus having had the proper quantity of standard filtering material placed therein and the air-tight lid replaced, the sewage may in the first instance by adjusting the cock E be passed through it at the rate of, say, five hundred thousand gallons per acre per twenty-four hours—that is to say, at a rate of about four pints per hour per square foot of filtering-surface in the apparatus—which may be regarded as a small section or unit of a large filter-bed. The sewage-regulating cock E having been adjusted, the tilting device D will discharge the contents of its compartments alternately at certain definite intervals, depending upon the weight $D^4$ used, and which might give, say, a half-pint per foot for each discharge without, however, altering the total rate of four pints per square foot per hour. These adjustments made, the aspirating apparatus is started and adjusted, so as to draw air, as shown by the meter, at the rate of, say, four cubic feet every ten minutes, or about seven cubic feet per square foot of filter-surface per hour. The filter being in full bacterial activity, these conditions of discharge, rest, and air-supply are maintained for, say, twenty-four hours, samples being subsequently drawn off by means of the cocks R R from different depths of the filter to discover the highest one at which the required standard of purification is attained. If, for example, this be found at a filter depth of four feet, the rate of flow might then be increased to, say, six pints per square foot of filter per hour, corresponding to about seven hundred and fifty thousand gallons per acre per twenty-four hours, and samples again drawn and tested after a further period of twenty-four hours, the difference in effect being noted. Assuming the result to have shown that a further foot of filter depth is now necessary to effect the required purification, the air-supply might then be increased or the factor of rest varied and samples again similarly taken to ascertain whether any economy is practicable while still securing the degree of purification desired. The factors A B C D that give the best result after careful experiment will represent the standard factors necessary for giving any desired degree of purification. Such sewage may in this way for the purposes set forth be described by letters and numbers, as $A^5$ $B^3$ $C^8$ $D^6$, for example, thus enabling the necessary plant for use on the large scale to be designed with confidence that it will yield corresponding results.

It will be obvious that the apparatus may without altering its character be modified in various ways. For example, instead of drawing the air through the filter by bellows and measuring the quantity thereof by an ordinary gas-meter, as in the arrangement hereinbefore described and shown in Figs. 1 and 2, there might be connected to the space B' in the lower part of the vessel A by means of a pipe Z, as shown in Fig. 6, a siphon flushing-tank W of predetermined capacity, provided with an air-tight cover X, having a lift-valve Y, adapted to open outwardly, the pipe Z, which is provided with a non-return valve at Z', being connected to the air-space above the water-level in the tank W and the vessel A above the upper surface of the filtering material therein being open to the external atmosphere either through a pipe G or otherwise. The arrangement of the flushing apparatus is such that during the emptying of the flushing-tank W by means of the siphon 2 a corresponding volume of air will be drawn into the vessel A, pass downwardly through the filtering material therein, and thence flow past the non-return valve at Z' into the said flushing-tank, thus replacing the water siphoned off, the valve Y being closed at this time. During the refilling of the flushing-tank the air now displaced by the water will escape by way of the valve Y. The frequency of operation of the flushing apparatus, and therefore of the intermittent air-supply, is controlled by a regulating-valve 1 on the water-supply pipe, and the capacity of the flushing-tank being known obviously affords a ready means of estimating the exact quantity of air drawn through the filtering material in any given period.

Having thus described my invention, what I claim as new, and desire to secure by Letters Patent, is—

1. In an apparatus for testing organically-contaminated liquids such as sewage and sewage effluents, the combination with a filter of standard material, means for controlling the rate of flow of the liquid to be tested, means for controlling the frequency of the discharge upon the filtering material, means for passing measured quantities of air through the filter and means for drawing off samples of the liquid at different filter depths; substantially as described.

2. In an apparatus for testing liquids contaminated with organic matter such as sewage and sewage effluents, the combination with a filter through which the liquid is caused to flow, means for controlling the rate of flow of the liquid from the supply, means for periodically augmenting and retarding the supply of liquid to the filter, means for causing known quantities of air to pass through the filter and means for draining off samples of the liquid at different depths in the filter; substantially as described.

3. In an apparatus such as described, the combination with an air-tight vessel containing filtering material, a perforated support for the filtering material located in the lower part of the vessel, a liquid-supply pipe, a valve for controlling the rate of flow of liquid, a distributing vessel at the top of the filter and into which the supply discharges, and from which the liquid is discharged at predetermined intervals upon the filtering material, collecting channels or troughs extending transversely of the interior of the filter, at different depths therein, cocks for draining off the liquid from said collecting-troughs, an air-exhausting device for drawing air in measured quantities through the filter; substantially as described.

4. In an apparatus such as described, the combination with the filter, a supply-pipe for the liquid to be tested, a tilting trough located at the top of the filter, and into which the supply-pipe discharges, and from which the liquid is periodically discharged upon the filtering material, and an air-exhausting device for drawing air through the filter; substantially as described.

5. In an apparatus such as described, the combination with the filter, the liquid-supply pipe, a valve for varying the rate of flow of the liquid, a tilting trough centrally divided into two compartments, and into which the liquid flows from the supply-pipe, whereby the two compartments of said trough will be alternately filled and the liquid automatically discharged upon the filtering material, and means for varying the frequency of the oscillations of the trough and means for drawing air in measured quantities through the filter whereby the quantity of liquid discharged in any given time may be varied; substantially as described.

6. In an apparatus such as described, the combination with the filter, of the trough or pan journaled in bearings in the upper part of the filter and divided into compartments, a liquid-supply pipe discharging into said pan or trough, whereby the compartments will be alternately filled and emptied, said pan being provided with a carrier adapted to receive different weights, whereby the weight of the pan may be varied to vary the frequency of its oscillation and means for causing air in measured quantities to pass through the filter; substantially as described.

7. In an apparatus such as described, the combination with the filter, having communication with the atmosphere at the upper end, means for supplying the liquid to be tested to the filter, a siphon flush-tank, a pipe leading from the flush-tank above the water-level to the filter below the filtering material, and a check-valve in said pipe, whereby as the flush-tank is emptied air will be drawn through the filter; substantially as described.

8. In an apparatus such as described, the combination with the filter having communication with the atmosphere at the upper end, means for supplying the liquid to be tested to the filter, a flush-tank of predetermined capacity, a siphon-tube located therein, means for supplying water to said tank, a pipe leading from the air-space above the water-level in said tank to the filter below the filtering material and a check-valve in said pipe, whereby as the water is siphoned out of the tank air will be drawn through the filter; substantially as described.

9. In an apparatus such as described, the combination with a filter of standard material, a liquid-supply, a valve for varying the rate of flow of the liquid, a tilting trough at the upper end of the filter, into which the liquid flows and from which it is intermittently discharged to the filter, a flush-tank of predetermined capacity, a siphon located therein, a water-supply for said tank, a pipe leading from the air-space above the water-level in the tank to the filter below the filtering material and a check-valve in said pipe, whereby as the water is siphoned out of the tank known quantities of air will be drawn through the filter; substantially as described.

10. In an apparatus for testing liquids contaminated with organic matter such as sewage and sewage effluents, the combination with a filter of standard material, means for varying the rate of flow of the liquid from the supply, means for varying the frequency of discharge of the liquid upon the filtering material, means for drawing known quantities of air through the filter, and means for drawing off samples of the liquid at different filter depths; substantially as described.

WILLIAM DUNDAS SCOTT-MONCRIEFF.

Witnesses:
THOMAS DURANT,
M. D. CHURCH.